United States Patent [19]

Carroll et al.

[11] Patent Number: 4,562,678
[45] Date of Patent: Jan. 7, 1986

[54] GRAIN BIN FLOORING

[75] Inventors: Michael W. Carroll, Roselle; Michael E. Harwood, Palatine; John H. Aldag, Chicago, all of Ill.

[73] Assignee: North American Agricultural, Inc., Schaumburg, Ill.

[21] Appl. No.: 573,969

[22] Filed: Jan. 26, 1984

[51] Int. Cl.$^4$ .............................................. E04B 1/70
[52] U.S. Cl. ........................................ 52/303; 52/674
[58] Field of Search ............... 52/263, 302, 303, 450, 52/670–672, 630, 674, 336, 646; 72/177, 186; 29/163.5 R

[56] References Cited

U.S. PATENT DOCUMENTS

| | | | |
|---|---|---|---|
| 764,989 | 7/1904 | Chester | 52/450 |
| 1,599,692 | 9/1926 | Trout | 52/646 |
| 2,417,899 | 3/1947 | Ashman | 52/630 |
| 3,367,161 | 2/1968 | Avakian | 72/186 |
| 3,512,322 | 5/1970 | Steffen | 52/263 |
| 3,520,100 | 7/1970 | Webb | 52/630 |
| 3,824,664 | 7/1974 | Seeff | 72/177 |
| 4,073,110 | 2/1978 | Kennedy | 52/303 |
| 4,106,249 | 8/1978 | Morton | 52/336 |
| 4,418,558 | 12/1983 | Simmons | 72/177 |

Primary Examiner—James L. Ridgill, Jr.
Attorney, Agent, or Firm—Fitch, Even, Tabin & Flannery

[57] ABSTRACT

The grain floor system uses floor plates of substantially uniform size, for example, three feet in width and seven feet in length which are corrugated and which are nestable one within the other for storage and for transportation. The floor plates are mounted on an air frame system and have hooded openings to form air holes over an extensive portion of the floor plates such as, for example, about ten percent of the floor area. The hoods are formed to project outwardly of inclined corrugated sidewalls to limit the amount of grain which may fall therethrough. Upper and lower hoods are formed about the holes which are elongated to provide additional strength for the floor plates. The holes are located in the middle of the sidewalls forming the corrugations.

8 Claims, 10 Drawing Figures

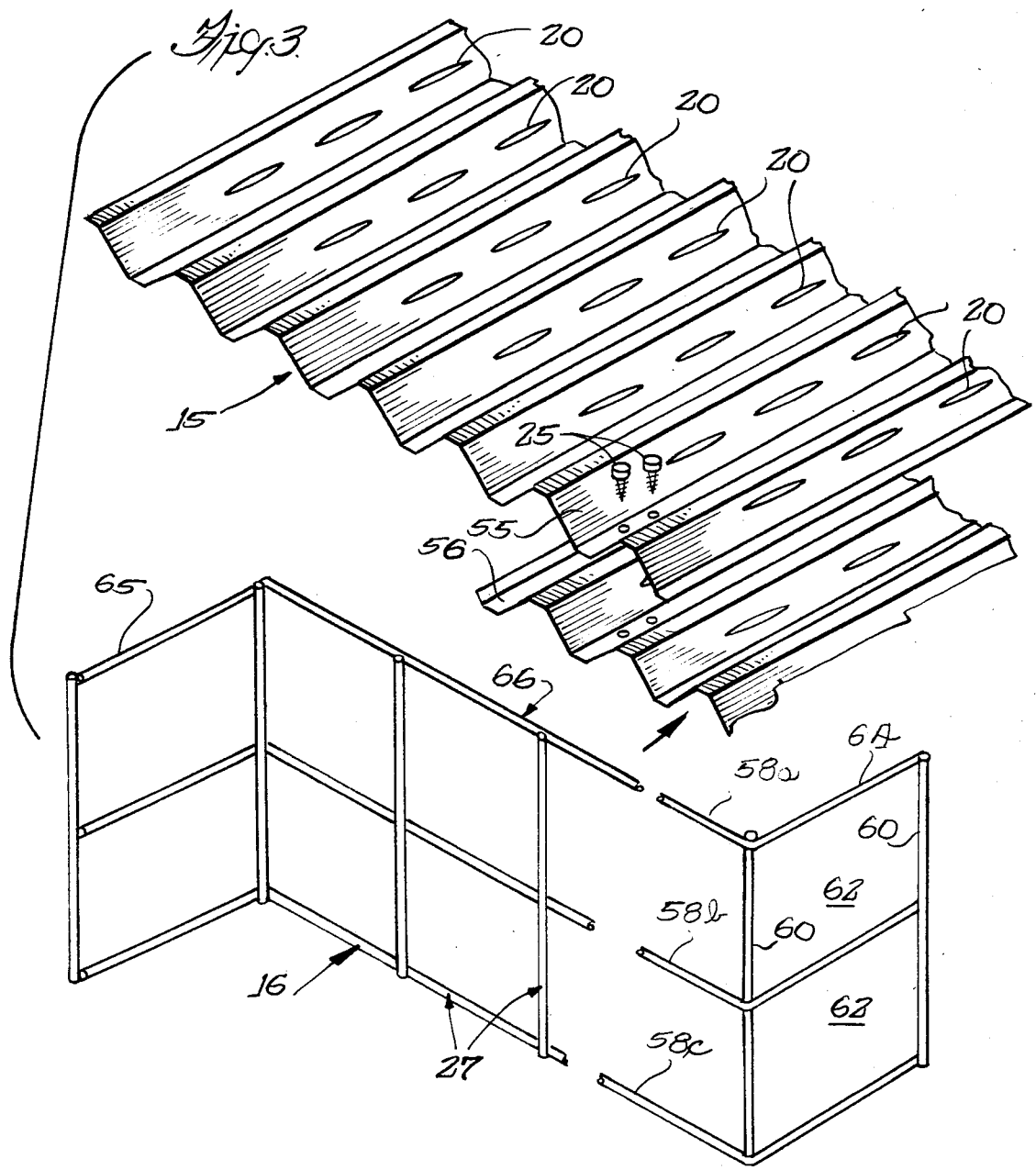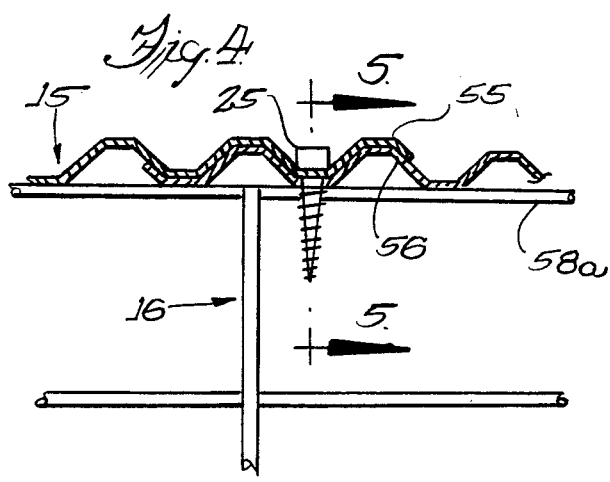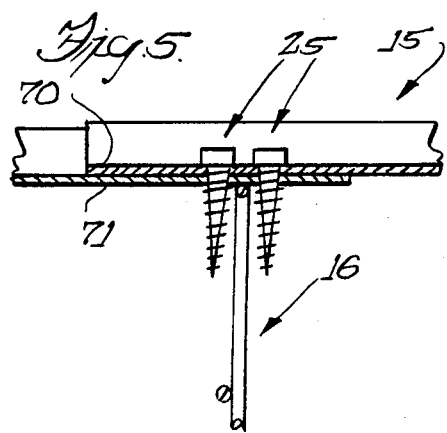

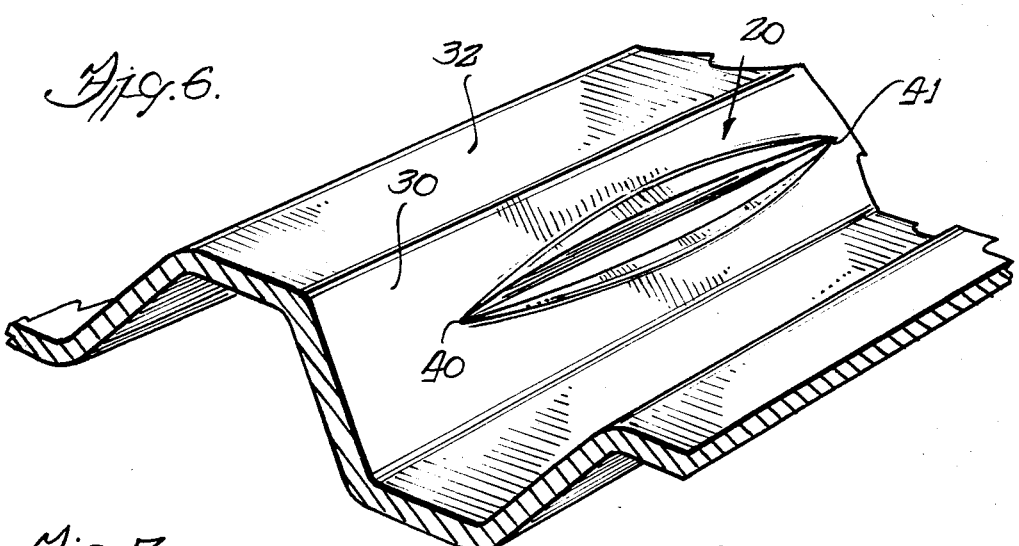
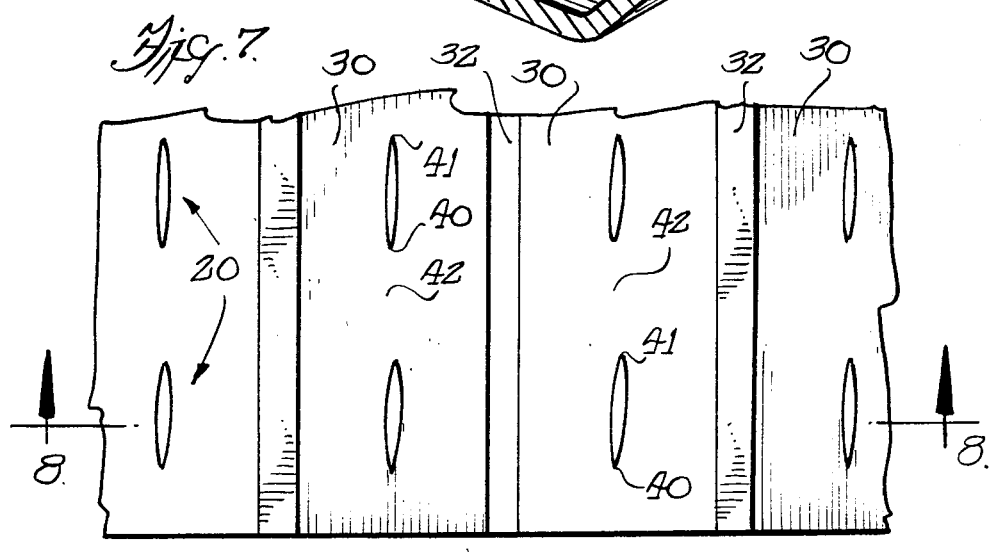
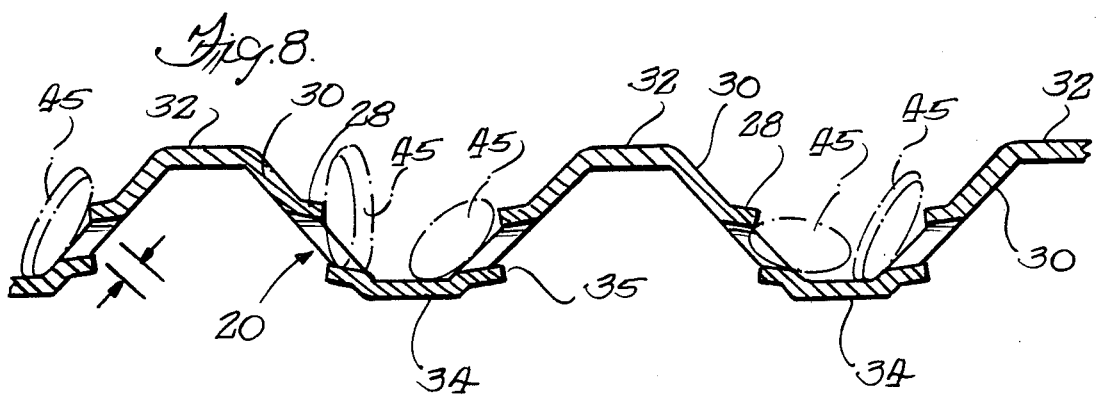

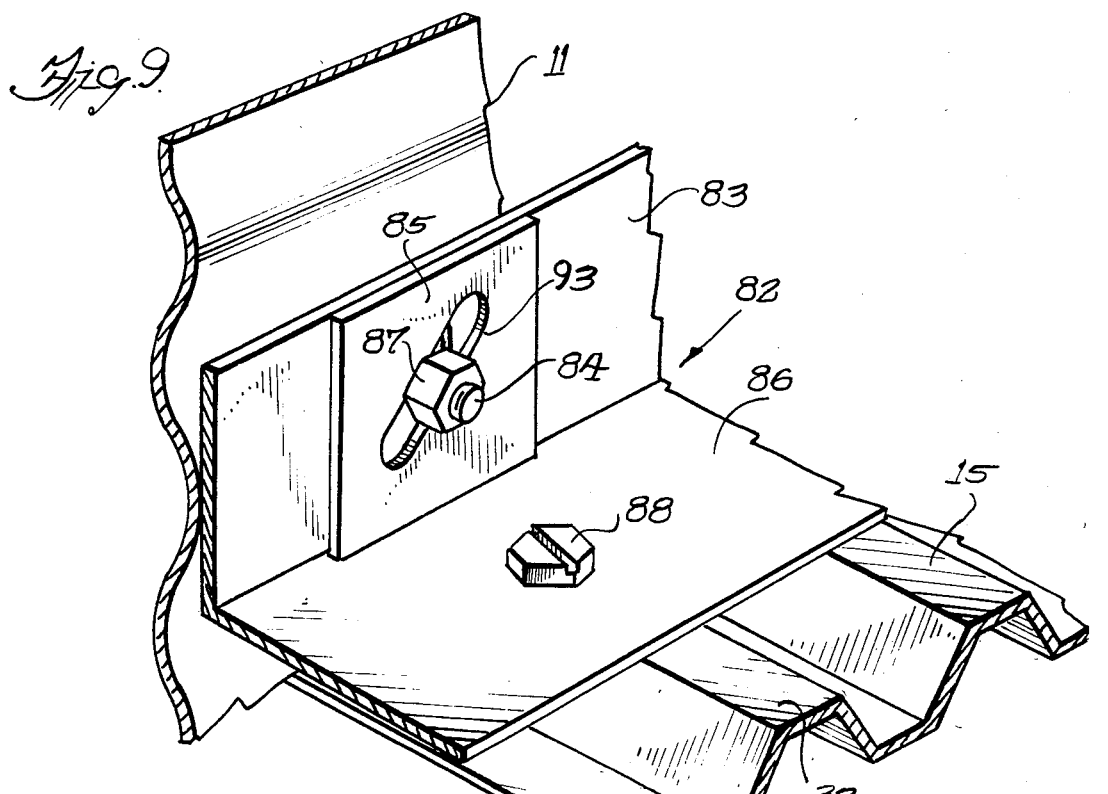
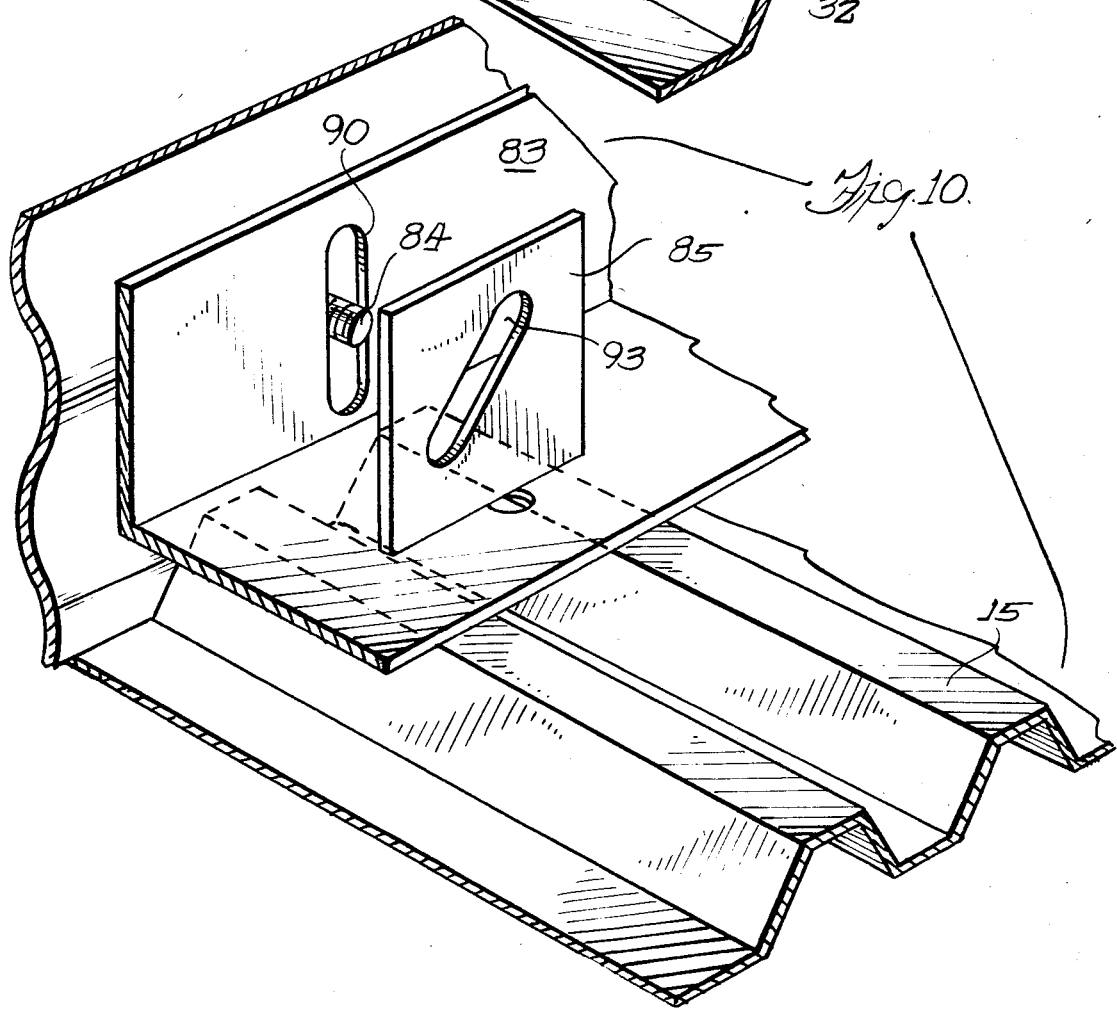

GRAIN BIN FLOORING

BACKGROUND OF THE INVENTION

This invention relates to floors for grain bins, or the like, and more particularly to aerated floor systems allowing air to circulate through the floor into the grain supported by the floor.

The present invention is directed to grain aeration system including a floor made of a plurality of floor plates or sheets supported on an underlying frame with apertures or openings in the floor plates through which air may be blown upwardly to aerate the grain resting on the floor plates. A typical grain floor is used in a cylindrical grain bin with the floor being circular in shape and being installed over a concrete pad, or the like. Grain floors of this type are often corrugated or ribbed in the longitudinal direction of the floor plates; and the air holes are quite extensive, for example constituting about ten percent of the floor plate surface area.

One conventional type of such grain flooring is assembled from plates cut to different lengths, the lengths decreasing from the central longest plate whose length equals the diameter of the floor, which diameter is often 15 to 105 feet. Such plates are often about seven inches in width. Proceeding in opposite directions from this central dimetrical floor plate are plates of decreasing length extending from one side of the bin to the other side of bin. Such floor plates are also formed with depending interlocking channels along their longitudinally extending sides. These interlocking channels add considerable height to the floor plate and make it difficult to stack the floor plates one on the other. Because each diameter of grain bin will use different lengths of such floor plates, a large inventory of floor plates is required at considerable inventory cost. Such long and high height plates are difficult to transport to the side of erection and difficult to transport about a warehouse. Furthermore, the channel edges prevent a compact stack of floor plates either in a warehouse or on a transporting vehicle or vessel.

Typically, the holes formed in the floor plates are round holes formed by a punch. Certain grains such as round shaped grains, like barley, milo or rape seed tend to fall through the holes and block airflow and cause an irretrivable loss of grain. Also, to obtain the snap fit between adjacent floor plate channels, the channels must be formed relatively precisely and aligned relatively precisely. Because of all of these shortcomings, the cost of such floors becomes relatively expensive.

A further desireable feature for a grain floor is that it be easy to clean and be readily swept by a bin sweep. The openings in the floor should not have sharp edges as will cut or damage grain during a cleaning or sweeping operation.

Accordingly, a general object of the invention is to provide a new and improved, as contrasted with the prior art, grain floor system.

A more specific object of the invention is to provide a tiled floor systems using new and improved floor plates with hooded openings to protect against grain loss through the openings.

DETAILED DESCRIPTION OF THE INVENTION

These and other objects and advantages of the invention will become apparent from the following detailed description taken in connection with the accompanying drawings in which:

FIG. 3 is an exploded fragmentary view of the floor system embodying the novel features of the invention;

FIG. 4 is a fragmentary cross-sectional view showing the connection of floor plates to the underlying frame;

FIG. 5 is a cross-sectional view taken substantially along the line 5—5 of FIG. 4;

FIG. 6 is an enlarged perspective view showing a hooded opening formed in the flooring;

FIG. 7 is a fragmentary plan view of the flooring;

FIG. 8 is an enlarged cross-sectional view taken substantially along the line 8—8 of FIG. 7;

FIG. 9 is a view illustrating the manner of attaching flashing between the bin floor and bin side wall;

FIG. 10 is an exploded view of a washer plate and the flashing.

Figure 1:
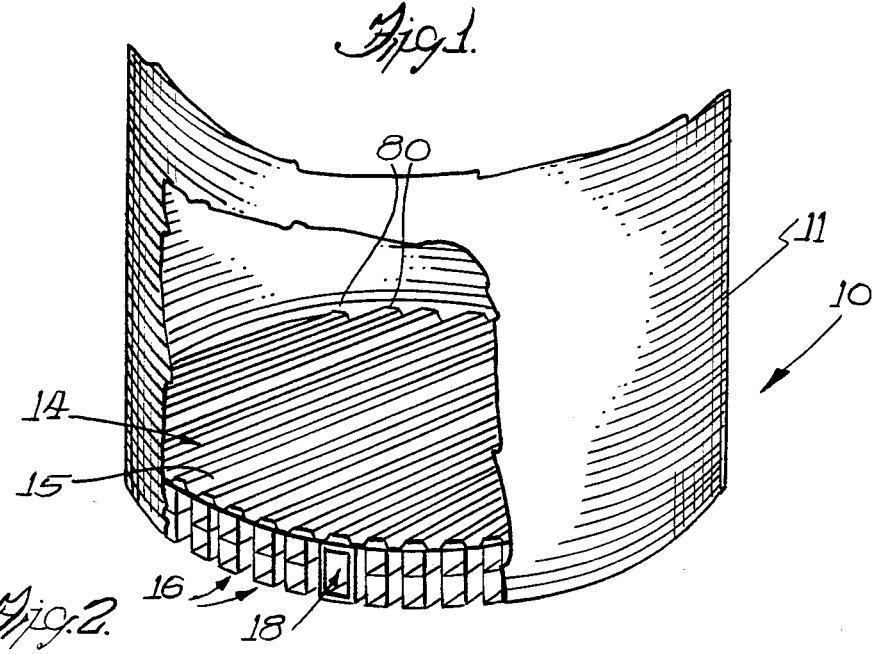
FIG. 1 is a diagramatic perspective view of a grain bin having a floor embodying the invention.
Figure 2:
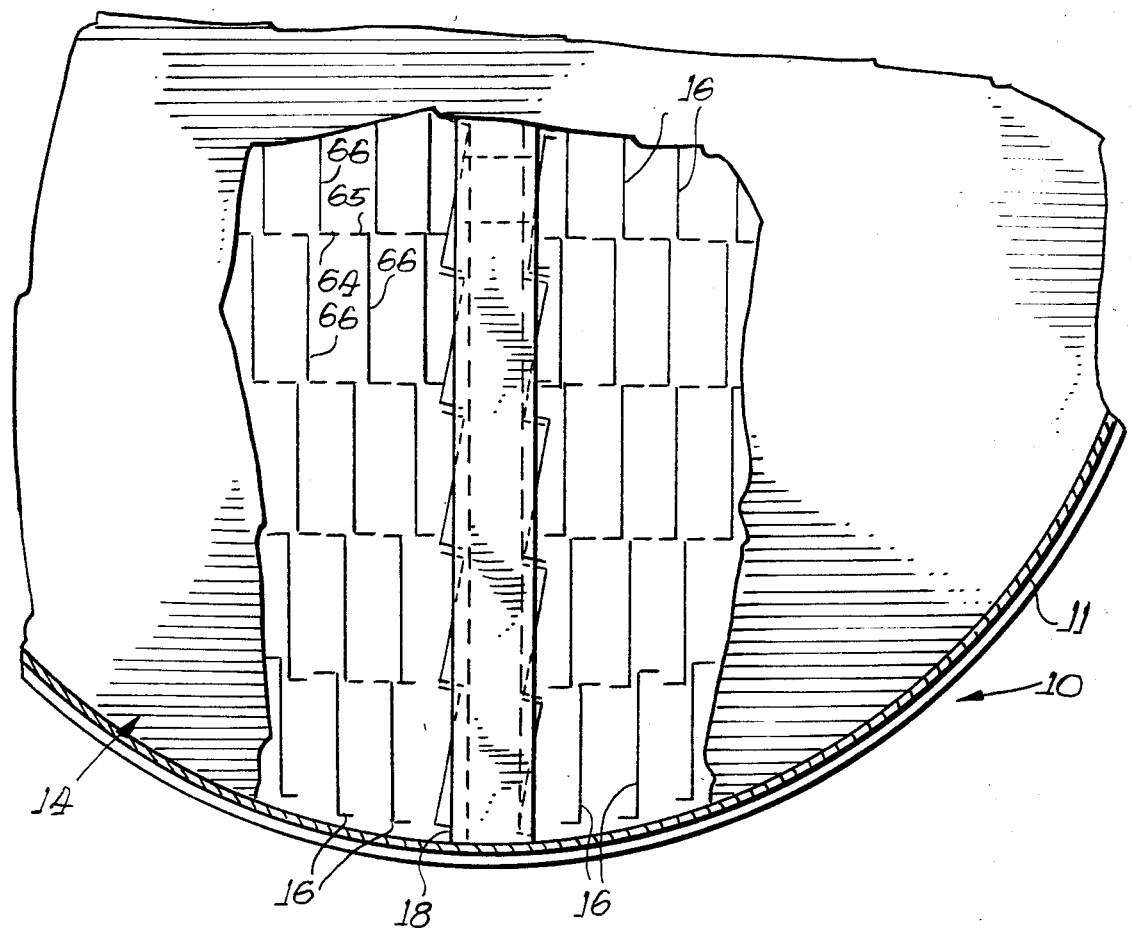
FIG. 2 is an enlarged plan view of the floor broken away to reveal an underlying frame.

As shown on the drawings for purposes of illustration, the invention is embodied in a grain bin 10 having an upstanding side wall 11 extending upwardly from an aerated flooring system 14 formed of a plurality of floor plates 15. The flooring system 14 includes an underlying frame preferably formed of wire frame sections 16, as best seen in FIG. 3. A suitable air duct 18, as shown in FIGS. 1 and 2 allows a blower (not shown) to blow air into the underlying frame which serves as an air frame to allow the dispersal of air throughout the grain floor with the air being substantially unimpeded by the wire frame sections 16. The floor plates 15 are provided with air openings or apertures 20, as best seen in FIG. 3 through which air is blown to aerate the grain resting on the bin flooring.

It is heretofore been a problem with aeration grain floors systems 14 that they were custom built to a particular diameter of floor, such that each floor plate extended the full width of the grain floor from one side wall to the opposed side wall. Thus, for a 30 foot diameter floor, the central floor section would be 30 feet in length and extend across the central diametrical portion of the floor between opposite sides of the grain bin wall. On opposite sides of the 30 foot floor plate would be a pair of identical length floor plates of lessor length, for example, 28 feet each extending between opposite sides of the grain bin wall and each attached at a longitudinal ledge to the central floor plate by manner of channel shaped interlocking edges, such as shown in U.S. Pat. No. 4,137,682. The channel shaped edges require some precision to snap fit into interlocking engagement and provide the relatively high depth to the floor plate and prevent stacking of a large number of such plates in a compact pile. Also, such a construction appears to have the tendency of concentrating the load of the grain onto the underlying supports in a manner that may damage the same. In any event, it is difficult to warehouse 30 foot sections and it is difficult to transport such 30 foot sections by conventional forklift trucks in the warehouse. Additionally, it is difficult to transport such long sections from a warehouse to the point of erection without the use of long flat bed trucks or equipment not commonly owned by farmers. From an inventory cost standpoint, the seller must stock a number of different diameters of grain bin floors usually ranging from 19 to 30 foot in diameter.

While it has been proposed in the past to use a tile like system of uniform size short pieces of floor plates to form the grain bin floor, such tiling systems have not been commercially successful in displacing the long length floor plates, as above described. The conventional floor plates are provided with round apertures which are punched into the floor plate and which provide openings through which round shapes of grains such as barley, milo, and rape seed may fall causing a blocking of the holes and a loss of grain. Futher, some conventional floor plates have openings formed with sharp edges which cut or damage the grain particularly when the grain is being swept from the bottom of the floor by an automatic bin sweep.

In accordance with the present invention, there is provided a novel grain floor system which eliminates the long length floor plates and uses small floor plates 15 preferably of uniform size, which by way of example, may be about three 3 in width by 7 feet in length and, which are interconnected without the use of interlocking, space-taking channel, edges with the result that the floor plates may be readily stacked, inventoried, and transported. That is, the floor plates 15 are of a convenient length to fit into farmers trucks and to be carried by fork lift trucks and to be stacked and stored in warehouses. To cover the floor space the the corrugated floor plates 15 are assembled side-by-side in the manner of tiling a floor except that the edges are overlapped and fastened together with fasteners 25 (FIGS. 4 and 5). The preferred floor plates are corrugated or ribbed and can readily nest one within the other so that they stack with a stacking thickness not much greater than the stock thickness and with a maximum length, in this instance, of about 7 feet and a maximum width of about 3 feet. The same floor plate 16 may be used in each of the varying diameters of grain bins from 19 to 30 feet, for example. Also, as will be explained, the underlying air frame 16 may be formed inexpensively from Z shaped sections of reinforcing wire formed into a Z-shaped configuration shown in FIG. 16 and stood on edge in a pattern such as shown in FIG. 2.

Also, in accordance with an important aspect of the invention, the grain is aerated through hooded openings 20 having, as best seen in FIG. 8, an upper metal hood or edge 28 projecting outwardly over the top of the opening which is formed in an inclined side wall 30 of the floor plate between an upper flat 32 and a lower flat 34 of the floor plate. The hoods 28 project over the opening, as viewed from a straight vertical overhead direction, to reduce the opening size to a straight downwardly dropping piece of grain so that less grain will fall through the opening. Further, the preferred openings are elongated in the longitudinal direction of the corrugated flooring rather than being round holes to further reduce the amount of large diametrical space exposed to a downwardly dropping piece of grain. That is, for a given area of opening, the elongated opening has less large exposed area relative to a given size of a grain than does a circular opening exposed to the same grain. Also, as can be seen from the enlarged configuration in FIG. 8, it is preferred that lower edges of the openings 20 be formed with the inwardly directed metal edge 35 which likewise assists in preventing the straight fall through of grain which may hit and rest thereon.

Refering now in greater detail to the illustrated embodiment of the invention, the floor plates 15 are preferably formed of corrugated sheets of steel which, by way of example, may be 20 Gauge galvanized steel fabricated from 36 inch width coil of steel. The floor plates are preferably corrugated in the longitudinal direction which will be approximately 84 to 90 inch in length in this preferred embodiment of the invention. After corrugation, the nominal width of the sheet will be about 35.75 inch. The preferred depth of the corrugations from the flat 32 at the top of the plate 15 to the bottom surface of the flat 34 at the bottom of the corrugation for the plate is in this instance about 0.25 inch. Heretofore, corrugations of about one-half inch made in more difficult for automatic bin sweeps to move across the flooring and to pick up the grain therefrom. The lessor degree of corrugation makes it easy for the broom of the bin sweep to remove the grain.

The width between the respective upper and adjacent flats 32 is, in this instance, 0.75 inch. Typically, the flat 32 and the lower flat 34 have a width of about 0.12 inch. All of these dimensions are by way of example only and the present invention is not to be construed to be limited to any particular dimensions or to the particular steel sheet given herein for the preferred and illustrated embodiment of the invention.

The openings 20 in the sheets are made on the inclined side walls 30 and they are in this instance about 0.38 inch in length from one edge 40 (FIGURE) to the other edge 41 with a spacing 42 (FIG. 7) therebetween of about 0.38 inch. The preferred hooded openings 20 are formed by a drawing operation in which the metal is slit and then drawn through dies at the time of being corrugated so that the openings are formed with the hood 28 and the lower metal edge 35 projecting in opposite directions. The space between the edges is, shown in the left hand side of FIG. 8, between the directional arrows ranges between a minimum of 0.03 inch and a maximum of 0.06 inch. With the illustrated embodiment of the invention, the air openings 20 result in about ten percent of the floor space actually being open to air flow therethrough. As can be seen in FIG. 8, pieces of grain 45 may be disposed at various angles relative to the openings 20 with the hooded edges 28 limiting the grains from closing the openings. The elongated openings leave space in the longitudinal direction between grain pieces for air flow from the openings into the grain. Of course, the openings 20 may admit some grain therethrough but the amount of grain lost is reduced from that heretofore experienced. With the hooded openings having been drawn rather than punched, and placed on the inclined side walls below the top flat 32 there are no sharp edges as will cut or damage the grain.

The illustrated plate size of nominally 36 by 90 inch size, weighs about 36 pounds, and can be readily handled manually for installation or for removal. When tiling, the sheets may be overlapped along the longitudinal side edges 55 and 56 by two corrugations and fastened together with with self-tapping threaded screw fasteners 25 which are driven through the respective overlap edges 55 and 56 of adjacent floor plates 15. The preferred overlap is made adjacent one of the wire frame sections 16.

Turning to FIG. 3, it will be seen that the preferred and illustrated wire frame section 16 is made of reinforcing wire often used in reinforcing concrete and includes horizontally extending wires 58a, 58b and 58c between which extend and to which are welded vertical wires 60. A pair of vertical wires with a pair of horizontal wires define a rectangular opening 62 through which air may flow. The lower wire 58c will rest on the concrete while the upper wire 58a will be in engagement with the lower surface of the flats 34 of the corrugated plates. To make the wire frames section 16 self-supporting so that they do not rotate downwardly and so that they become self-sustaining in an upright position, it is preferred to form the sections with a pair of right angle ends or legs 64 and 65 which extend at opposite directions from a central section 66.

To form a good work of the wire frame section 16, it is preferred that they be assembled in the manner shown in FIG. 2 in which a right hand leg 64 and a left hand leg 65 is disposed in alignment and facing a left hand leg. The central sections 66 may be aligned and parallel to one another.

In the preferred embodiment of the invention, the floor plates are overlapped at about 2 inches at their longitudinal ends 70 and 71 as best seen in FIG. 5 and is is also preferred to use the self-tapping threaded fasteners 25 to be driven through the overlapped ends 70 and 71 on opposite sides of an air frame section 16. The typical distance between the fasteners across the width of the sheets is about 12 inches. If the overlapped edges are in alignment directly over an air frame, it may be possible that the loading of grain would bend one of the edges downwardly about the nearest supporting wire frame section 16.

In tiling the bin, the floor plates 15 are cut with an abrasive material cutting plate of a circular saw to form the arcuate ends 80 shown in FIG. 1 adjacent the grain bin wall 11. For example, for a 35-foot diameter bin, five floor plates each 90 inches in width are overlapped end-to-end with the two end floor plates cut along arcuate edges 80 adjacent the opposed bin walls. The end pieces are cut off and saved so that they may be used again where a floor piece does not quite reach the bin wall and the previously cut piece may be re-cut to extend to the bin wall and fitted into place.

Between the floor plate 15 and the bin wall 11 is attached a right angle flashing 82 which includes an upstanding leg 83 attached by a threaded bolt 84, a washer plate 85, and a nut 87 to the bin wall 11. A lower horizontal integral leg 86 of the flashing 82 extends horizontally and is connected by a threaded fastener 88 to the upper flat 32 of a rib on the floor plate. Because the height of the bolts 84 is often fixed and height of the floor plates may vary somewhat, it is preferred that the flashing be performed with a vertical opening 90 through which the bolt stud 84 may project. Rather than letting grain fall through the remainder of the opening 90 into the grain bin wall corrugations behind the flashing leg 83, it is preferred that the washer 85 block the remainder of the opening 90. To this end, it is formed with an oblique slot 93 through which may be projected the bolt stud 84 so that the aligned portions of the washer slot 93 and 90 admit only the bolt stud 84 with the remainder rectangular body of the washer 85 covering the vertical slot 90 in the flashing.

The preferred metal plates are cold worked extensively when forming the corrugations and then working the metal to expand slits to form the hooded openings 20. The metal in the sheets experiences reverse bending and also drawing with the metal about the upper flat 32 and lower flat 34 being actually coined. It appears that the yield tensile strength may be increased from about 33,000 psi to 50,000 psi. This great increase in strength assists in holding greater weights of grain above the floor plate. Increased strength makes for less costly and less thick floor plates.

From the foregoing it will be seen that the present invention provides a new and improved structural flooring which is formed of floor plates which can be readily assemblied together and yet which are easily transportable and stored. The hooded openings in the sheets admit air while reducing the amount of grain flow therethrough. The floor plates may be assembled to provide circular floors for bins of varying diameters. They may be readily assembled to an underlying wire frame which may be inexpensively manufactured. The floor plates may also be readily disassembled to remove grain dropping below the floor plate and then reassembled.

While a preferred embodiment has been shown and described, it will be understood that there is no intent to limit the invention by such disclosure but, rather, it is intended to cover all modifications and alternate constructions falling within the spirit and scope of the invention as defined in the appended claims. What is claimed:

1. A grain floor with an aeration system for grain stored thereon, said floor comprising:

an underlying air frame, a grain floor mounted on said underlying air frame, a plurality of rectangular floor plates, each having a longitudinal direction and supported on the air frame, said plates being formed with corrugations extending in the longitudinal direction of the plates and with said corrugations being formed in a drawing operation, said corrugations including a top and a bottom wall and downwardly and outwardly inclined walls extending between the top and bottom walls, said corrugated plates being uniform in size and being nestable with the corrugations of one plate fitting in the corrugations of the other plate for storage and during transportation thereof, said corrugations being less than one-half inch in depth to facilitate broom sweeping of grain from the corrugations, a plurality of elongated air holes in the inclined side walls of the corrugations, the air holes being elongated in the longitudinal direction of the plates and being located in the middle of the inclined sidewalls of the corrugations, upper elongated hoods formed in the inclined sidewalls of the corrugations projecting outwardly from the inclined sidewall and over the holes to at least partially cover the holes to limit the straight vertical drop of grain through the holes, and lower hoods projecting from lower edges of the air holes to provide strength to the plate.

2. A grain floor in accordance with claim 1 in which the grain holes extend about three-eights of an inch in the longitudinal direction.

3. A grain floor in accordance with claim 1 in which the width of the corrugations is about three-fourths of an inch between adjacent upper walls on adjacent corrugations.

4. A grain floor in accordance with claim 1 in which said lower hood is spaced by an air gap from the upper spaced hood and is projecting inwardly.

5. A grain floor in accordance with claim 1 in which about ten percent of the grain floor area is occupied by said air holes.

6. A grain floor in accordance with claim 1 in which said floor plates are about seven feet in longitudinal direction and about three feet in the transverse direction.

7. A grain floor in accordance with claim 1 in which edges of adjacent floor plates have corrugations nested and overlapped and in which fasteners secure the overlapped corrugations to each other.

8. A grain floor plate for use with an aeration system for grain stored thereon, said floor plate comprising:

a rectangular plate of metal having a longitudinal direction for being supported on an air frame, said plate being formed with corrugations extending in the longitudinal direction of the plate and with said corrugations being formed in a drawing operation, said corrugations including a top and a bottom wall and downwardly and outwardly inclined walls extending between the top and bottom walls, said corrugated plate being nestable with the corrugations of another plate for storage and for transportation of said floor plate, said corrugations being less than one-half inch in depth to facilitate broom sweeping of grain from the corrugations, a plurality of elongated air holes in the inclined side walls of the corrugations, the air holes being elongated in the longitudinal direction of the plate and being located in the middle of the inclined sidewalls of the corrugations, upper elongated hoods formed in the inclined sidewalls of the corrugations projecting outwardly from the inclined sidewall and over the holes to at least partially cover the holes to limit the straight vertical drop of grain through the holes, and lower hoods projecting from lower edges of the air holes to provide strength to the plate.

* * * * *